(12) United States Patent
Van Sickle et al.

(10) Patent No.: US 11,099,831 B2
(45) Date of Patent: Aug. 24, 2021

(54) FIRMWARE UPDATE IN A STORAGE BACKED MEMORY SYSTEM

(71) Applicant: Micron Technology, Inc., Boise, ID (US)

(72) Inventors: Gary R. Van Sickle, Arden Hills, MN (US); Jeffery J. Leyda, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 53 days.

(21) Appl. No.: 16/054,125

(22) Filed: Aug. 3, 2018

(65) Prior Publication Data

US 2019/0243635 A1 Aug. 8, 2019

Related U.S. Application Data

(60) Provisional application No. 62/627,969, filed on Feb. 8, 2018.

(51) Int. Cl.
*G06F 8/654* (2018.01)
*G06F 11/10* (2006.01)
*G06F 11/14* (2006.01)

(52) U.S. Cl.
CPC .......... *G06F 8/654* (2018.02); *G06F 11/1004* (2013.01); *G06F 11/1048* (2013.01); *G06F 11/1433* (2013.01)

(58) Field of Classification Search
CPC .. G06F 8/654; G06F 11/1004; G06F 11/1048; G06F 11/1433

(Continued)

(56) References Cited

U.S. PATENT DOCUMENTS 5,596,713 A * 1/1997 DeRoo ................ G06F 9/30101
711/103
5,872,967 A * 2/1999 DeRoo ................ G06F 9/30101
711/E12.083

(Continued)

FOREIGN PATENT DOCUMENTS

| TW | 201937365 | 9/2019 |
| WO | 2014204331 | 12/2014 |
| WO | 2019156876 | 8/2019 |

OTHER PUBLICATIONS

"International Application Serial No. PCT US2019 015917, International Search Report dated May 15, 2019", 3 pgs.

(Continued)

*Primary Examiner* — Lewis A Bullock, Jr.
*Assistant Examiner* — Theodore E Hebert
(74) *Attorney, Agent, or Firm* — Schwegman Lundberg & Woessner, P.A.

(57) ABSTRACT

Devices and techniques for firmware update in storage backed memory are disclosed herein. A firmware image can be stored to a volatile portion of the memory package in response to receiving the firmware image via a first interface of the memory package. A save indication can be received at a second interface of the memory package. The firmware image can be transferred from the volatile portion of the memory package to a non-volatile portion of the memory package based on the save indication. A firmware update indication can be received at the second interface. A firmware update of the memory package can be performed based on the firmware update indication.

20 Claims, 5 Drawing Sheets

(58) Field of Classification Search
USPC .......................................................... 717/168
See application file for complete search history.

(56) References Cited

U.S. PATENT DOCUMENTS

| | | | | |
|---|---|---|---|---|
| 6,009,495 | A * | 12/1999 | DeRoo | G06F 9/30101 711/103 |
| 6,205,548 | B1 * | 3/2001 | Hasbun | G06F 8/65 713/2 |
| 6,282,675 | B1 * | 8/2001 | Sun | G06F 11/1417 713/2 |
| 6,711,675 | B1 * | 3/2004 | Spiegel | G06F 9/4401 713/164 |
| 7,213,152 | B1 * | 5/2007 | Gafken | G06F 8/65 713/187 |
| 7,725,890 | B2 * | 5/2010 | Kawaura | G03G 15/5075 717/168 |
| 10,152,264 | B1 * | 12/2018 | Butcher | G06F 3/0646 |
| 10,268,584 | B2 * | 4/2019 | Hahn | G06F 3/0659 |
| 2003/0095648 | A1 * | 5/2003 | Kaib | G06F 8/65 379/106.02 |
| 2005/0005102 | A1 * | 1/2005 | Meggitt | G06F 8/61 713/164 |
| 2006/0179308 | A1 * | 8/2006 | Morgan | G06F 21/575 713/168 |
| 2008/0126784 | A1 * | 5/2008 | Iima | G06F 11/2094 713/2 |
| 2010/0199125 | A1 * | 8/2010 | Reche | G06F 11/108 714/6.22 |
| 2010/0205470 | A1 * | 8/2010 | Moshayedi | G11C 5/141 713/340 |
| 2011/0179407 | A1 * | 7/2011 | Minegishi | G06F 8/65 717/170 |
| 2012/0137049 | A1 * | 5/2012 | Mollichelli | G06F 8/66 711/103 |
| 2012/0230254 | A1 * | 9/2012 | Otamendi | H04W 76/10 370/328 |
| 2013/0138866 | A1 * | 5/2013 | Asfur | G06F 12/02 711/103 |
| 2014/0208004 | A1 * | 7/2014 | Cohen | G06F 12/0246 711/103 |
| 2015/0248334 | A1 * | 9/2015 | Lucas | G06F 11/1433 714/23 |
| 2015/0370653 | A1 * | 12/2015 | Scott | G06F 9/4411 714/19 |
| 2017/0010874 | A1 * | 1/2017 | Rosset | H04L 67/34 |
| 2017/0040057 | A1 * | 2/2017 | Cho | G06F 13/16 |
| 2018/0365423 | A1 * | 12/2018 | Poppe | G05B 19/0426 |
| 2019/0243635 | A1 * | 8/2019 | Van Sickle | G06F 11/1048 |
| 2019/0317894 | A1 * | 10/2019 | Frolikov | G06F 12/0802 |
| 2020/0073580 | A1 * | 3/2020 | Frolikov | G06F 8/656 |

OTHER PUBLICATIONS

"International Application Serial No. PCT US2019 015917, Written Opinion dated May 15, 2019", 5 pgs.

"Taiwanese Application Serial No. 108104092, Office Action dated May 29, 2020", w English Translation, 14 pgs.

"International Application Serial No. PCT US2019 015917, International Preliminary Report on Patentablity dated Aug. 20, 2020", 5 pgs.

"Taiwanese Application Serial No. 108104092, Response filed Sep. 2, 2020 to Office Action dated May 29, 2020", w English Claims, 46 pgs.

"European Application Serial No. 19751223.9, Response filed Mar. 25, 2021 to Communication pursuant to Rules 161(2) and 162 EPC dated Sep. 15, 2020", 11 pgs.

\* cited by examiner

US 11,099,831 B2

FIRMWARE UPDATE IN A STORAGE BACKED MEMORY SYSTEM

PRIORITY APPLICATION

This application claims the benefit of priority to U.S. Provisional Application Ser. No. 62/627,969, filed Feb. 8, 2018, which is incorporated herein by reference in its entirety.

BACKGROUND

Memory devices are typically provided as internal, semiconductor, integrated circuits in computers or other electronic devices. There are many different types of memory, including volatile and non-volatile memory. Memory devices store data for other components. Byte addressable memory devices can be directly used by processors or other components to store both current state data as well as data not directly connected to a current system state. Block addressable devices, such as hard disk drives, are storage devices that are generally not directly usable by system components to store state information. Often, a memory device serves as an intermediary, where block addressed data is loaded into the memory device before use by the system.

Volatile memory requires power to maintain its data, and includes random-access memory (RAM), dynamic random-access memory (DRAM), or synchronous dynamic random-access memory (SDRAM), among others. Volatile memory devices are widely deployed in computing systems. Generally, these devices are byte addressable and thus directly accessible from processors, unlike storage devices that are addressable in pages, blocks, etc. Volatile memories like SRAM and DRAM are also fast enough to satisfy user expectations for device performance.

While the power-dependent nature of volatile memories is not an issue under many circumstances, there are instances in which the loss of data, such as system state data, uncommitted transactions, etc., can be problematic. In these circumstances, losing power to the volatile memory can mean corrupted data or an inability to diagnose a problem because the evidence of the problem is lost when the volatile memory powers down. To address these instances, a variety of techniques have been tried. For example, battery backed RAMs use a secondary independent power source, a battery, to maintain the volatile memory contents in case the primary power source ceases to function. Battery backed RAMs had limited effectiveness due to the limited duration of the storage (e.g., when the battery could no longer provide power the contents were lost).

Non-volatile dual in-line memory modules (NVDIMMs) combine a popular volatile memory package family of standards (DIMMs) with non-volatile storage, such as NAND flash, to provide power-off retention of volatile memory contents for extended periods of time. The Joint Electron Device Engineering Council (JEDEC) has promulgated several standards pertaining to DIMMs, including Double Data Rate (DDR) memory interfaces and NVDIMMs that use DDR interfaces. NVDIMM-N is a family of JEDEC standards in which a DIMM includes flash storage and a controller in addition to DRAM or SRAM volatile memories. JEDEC standard 245B.0 (JESD245B.05) for Byte Addressable Energy Backed Interface (BAEBI) provides a number of implementation and interaction details with an example of a NVDIMM.

BRIEF DESCRIPTION OF THE DRAWINGS

The present disclosure is illustrated by way of example and not limitation in the figures of the accompanying drawings, in which like references indicate similar elements.

DETAILED DESCRIPTION

Figure 1:
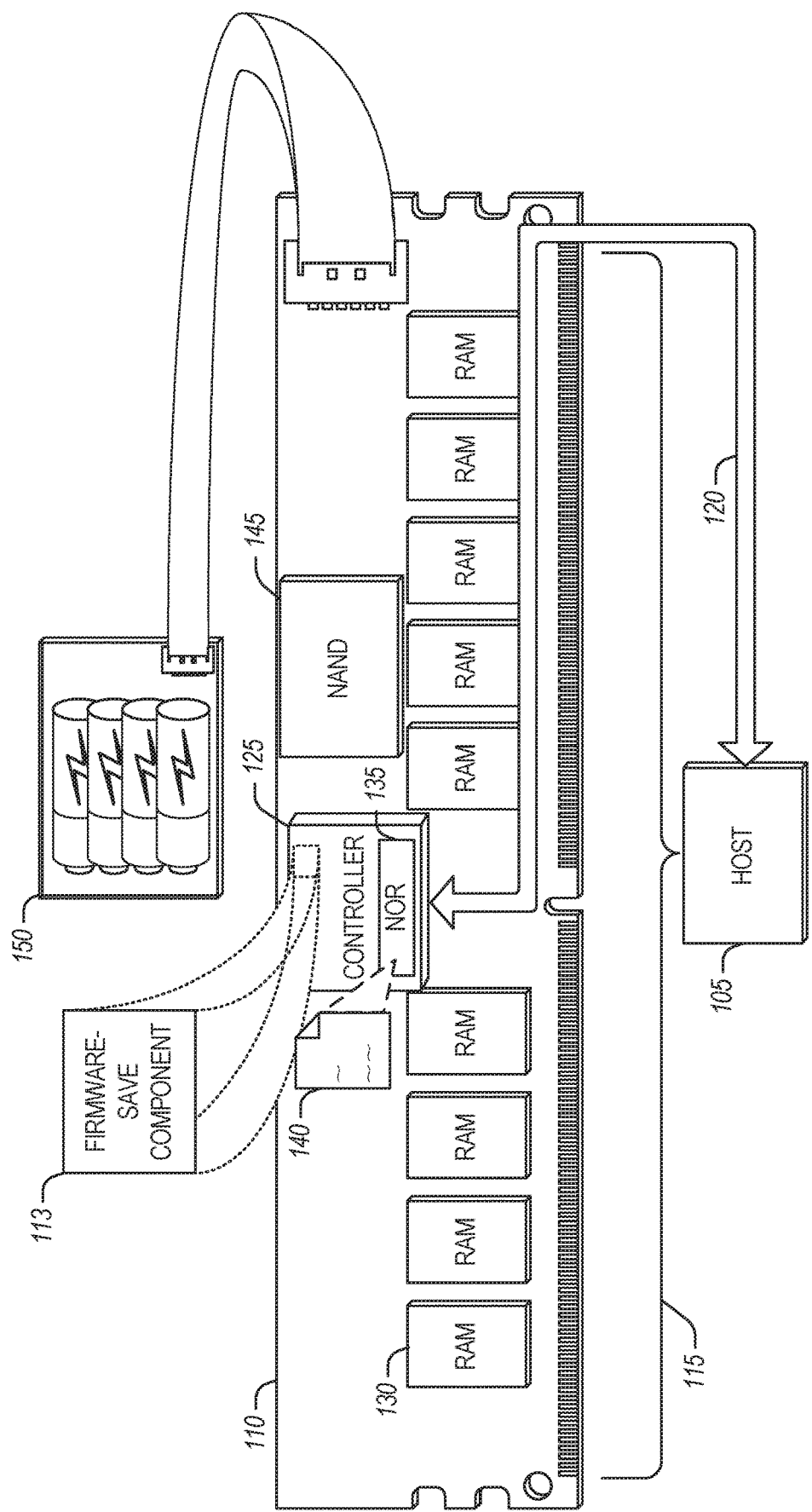
FIG. 1 illustrates an example of a NVDIMM to implement a firmware update management, in accordance with some implementations of the present disclosure.

The following discussion is generally directed toward storage backed memory packages that conform to the NVDIMM-N family of standards. However, other storage backed memory packages can also benefit from the devices and techniques described below. As noted above, NVDIMM-N devices locate a NAND flash device on the module. A controller (e.g., processing device) is also included on the module. The controller is generally an application specific integrated circuit (ASIC), a field programmable gate array (FPGA), or other processing circuitry, arranged or programmed to manage data transfers between the DRAM or SDRAM volatile portion of the module to the flash non-volatile portion (e.g., the storage backing the DRAM or SDRAM memory). Often, the controller optimized for energy, space (e.g., die size), or process (e.g., using larger feature sizes) efficiency instead of computational speed. NVDIMM-N devices include two interfaces, a DDR version 4 (DDR4) memory interface to enable a host (e.g., processor) to use the module for system memory, and an Inter-Integrated Circuit (I2C, I²C, or IIC) bus to enable the host to communicate directly to the controller.

I2C is a packet switched bus that uses a two-wire connection (e.g., one wire for a clock signal and one wire for a data signal) running at one megahertz. Thus, I2C provides a flexible and efficient addition to many discrete integrated circuits within a system. However, I2C is quite slow when compared to the DDR4 memory interface, with I2C having either a 100 or 400 kilobits (Kbits) per second throughput and DDR4 having data rates between 1,600-3,200 megabits (Mbits) per second throughput. Host communication with the controller over I2C generally involves reading and writing registers of the controller. For example, a host can issue a partial save command to the controller by setting beginning and end address registers and actuating a save register via I2C.

Often, the controller executes firmware to complete a variety of tasks. Occasionally, firmware updates are used to correct errors, or increase the efficiency of these tasks. Traditionally, the direct host-to-controller interface, such as I2C, has been used to communicate a firmware update to the controller. Often, the controller will then verify the update (e.g., by comparing the update to a checksum of the update, verifying a cryptographic key associated with the update, check a version of the update, etc. Once verified, the controller replaces its software with the update and restarts to run the update.

A problem with the traditional update arises with the speed of the host-to-controller interface. For example, for an update of several megabytes (e.g., 9.5 megabytes), and an I2C host-to-controller interface, simply transferring the update to the controller can take an hour or more due to the low bit-rate and high signaling overhead on the I2C bus.

Aspects of the present disclosure are directed to a firmware update in a storage backed memory, or memory sub-system (e.g., "memory device"). An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Thus, to address the host-to-controller interface speed problem, the firmware update is transferred from the host to the storage backed memory package via the memory interface, which has a much higher throughput than the host-to-controller interface. However, the volatile portions of the memory package are not generally freely accessible by the firmware update portions of the controller. The controller is generally limited to copying some or all of the volatile portions to the non-volatile portion of the memory package as instructed by the host. To avoid an extensive re-work of controller operations, and to maintain compliance to memory standards, the host writes the firmware update to the volatile portion and then triggers a save of the volatile portion. The host also signals that the save is related to a firmware update. The controller performs the instructed save and then uses the save data to access the firmware update in the non-volatile portion. The controller can then perform verification on the firmware update and install it when the verification passes. By employing this technique, storage backed memory packages can improve firmware update times without significant re-design of many components of the storage backed memory package. Additional details and examples are provided below.

FIG. 1 illustrates an example of a NVDIMM 110 to implement a firmware update management, in accordance with some implementations of the present disclosure. In an example, the NVDIMM 110 conforms to a JEDEC NVDIMM-N family of standards. The NVDIMM 110 includes a controller 125, a volatile storage portion 130, a non-volatile storage portion 145, a first interface 115 (e.g., a DDR interface), and a second interface 120 (e.g., an I2C bus). The volatile portion 130 includes one or more DRAM or SRAM integrated circuits (ICS) to store data for read or write operations of the host 105 via the first interface 115. The non-volatile storage portion 145 can be implemented in any storage technology that does not require power in order to maintain state. Example non-volatile storage technologies can include NAND flash, NOR flash, storage class memory (e.g., phase change memory), magnetic storage, and the like.

The second interface 120 is generally used by the host 105 to communicate directly with the controller 125 to perform a variety of operations. The controller 125 is arranged to implement these operations within the NVDIMM 110. The controller 125 is implemented as electronic hardware, such as an FPGA, ASIC, digital signal processor (DSP), or other processing circuitry, such as an example of the firmware-save component 113 illustrated here. In an example, the controller executes instructions (e.g., firmware) on the electronic hardware to perform the operations. This is another example of the firmware-save component 113 illustrated in FIG. 5. The BAEBI family of standards define a number of operations implemented by compliant devices.

When the second interface 120 is an I2C bus, typical communications involve the host 105 setting registers in the controller 125 via the second interface 120. For example, the host 105 can set a specific register such that a specific bit in that register is changed from a zero into a one. When this hit value change corresponds to execution of a command, the controller 125 performs the command in response to the bit modification. If the command has arguments, the host 105 can set the registers corresponding to the arguments. In this case, the controller 125 is arranged to check these argument registers to retrieve the data to complete the command. As noted above, this procedure, in the context of a firmware update (e.g., transferring a firmware image 140 from the host 105 to the controller 125) can take a long time, impacting system availability. To address this problem, the storage backed memory package 110 receives the firmware image 140 via the first interface 115, for example, from the host 105. The controller 125 is arranged to store the firmware image 140 in the volatile portion 130. This operation operates as a typical memory operation between the host 105 and the controller 125 e.g., saving state data for applications running on the host 105 that would be typical even if the memory module were not a storage backed memory package.

The controller 125 is arranged to receive a save indication at the second interface 120. In an example, the save indication is a register setting of the memory package. In an example, the register setting includes a first register that includes a starting offset within the volatile portion 130, and a second register that includes a length. Here, the starting offset and the length corresponding to the firmware image 140. Setting argument registers (e.g., volatile portion address and length) and setting a "save command" register are idiomatic of I2C operations. However, the save indication can take on a variety of forms, such as an interrupt, a high or low voltage on a "save" pin, etc. In an example, an agreed upon location (e.g., address) of the volatile portion in which the firmware image 140 will be stored by the host 105 can alleviate signaling the address in the save indication. Similarly, in an example, the length of the reserved (e.g., pre-agreed upon, or pre-set) firmware image 140 location in the volatile portion 130 can also be agreed upon, again alleviating signaling overhead.

The controller 125 is arranged to transfer the firmware image 140 from the volatile portion 130 to the non-volatile portion 145 based on the save indication. Here, the controller 125 operates as it would in a typical storage backed memory package save. In an example, transferring the firmware image from the volatile portion of the memory package to the non-volatile portion of the memory package is also based on a firmware update indication provided, for example, from the host 105.

In an example, to transfer the firmware image 140 from the volatile portion 130 to the non-volatile portion 145, the controller 125 is arranged to transfer the firmware image 140 to a NAND flash segment of the non-volatile portion 145 of the memory package. In this example, the NOR 135 segment of the controller 125 is also considered part of the non-volatile portion 145.

In an example, the controller 125 is arranged to verify the firmware image 140. The verification can be part of the volatile to non-volatile transfer. In an example, to verify the firmware image 140, the controller 125 is arranged to inspecting a first page of the NAND flash segment to identify a firmware update header based on data unique to an update header. This data can include such things as a manufacturer identification, a particular range of serial numbers, or other data that distinguish the firmware image 140 from other data.

In an example, the controller 125 is arranged to transfer the firmware image 140 from the NAND flash segment to a serial NOR 135 flash segment of the non-volatile portion 145. In an example, this transfer includes removal of at least one of headers or error correction code (ECC) data from the firmware update. In these examples, the NAND segment is typically used to provide the volatile portion 130 backing and the NOR segment 135 is the storage for controller operations. Thus, while the controller 125 has access to the NAND segment, other controller mechanisms to implement the firmware update can expect that the firmware image 140 is placed into the NOR segment 135.

The controller 125 is arranged to receive a firmware update indication at the second interface 120. In an example, the firmware update indication is a register setting, for example, of the controller 125. In an example, the register setting includes a register setting that a firmware download via a segment of the non-volatile portion of the memory package is forthcoming. This example enables, for example, the controller 125 to anticipate that a next save is actually the firmware image 140. Thus, the controller 125 can avoid signaling overhead in the update indication by using parameters from the save operation to locate the firmware image 140 in the non-volatile portion 145. In an example, the register setting includes a register setting for firmware update mode in accordance with a JEDEC BAEBI family of standards. In an example, the JEDEC BAEBI family of standards include a JESD245B.01 standard.

The controller 125 is arranged to perform a firmware update based on the firmware update indication. In an example, to perform the firmware update, the controller 125 is arranged to validate at least one of a checksum or signature of the firmware update. This validation ensures that the firmware is compatible (e.g., as between versions of the firmware image 140), that it is not corrupted, or that it is from a trusted source. In an example, the controller 125 is arranged to update a boot vector to point to the firmware image 140. Thus, the validated firmware image 140 is stored in area 'B' of the NOR segment 135 while the old firmware image is stored in area 'A' of the NOR segment 135. The updated boot vector originally included a start address for area 'A' and is now changed to include a start address for area 'B'. In an example, the controller 125 is arranged to communicate to a host that the firmware update is valid and has been received. This communication can be an interrupt, or setting a register that the host can read from the second interface 120, for example. In an example, the controller 125 is arranged to restart the memory package in response to receipt of a reset command that was transmitted in response to the communication to the host 105 that firmware update is valid and has been received. Here, the memory package uses the firmware update following the restart.

The NVDIMM 110 can optionally include a power source 150 separate from host power. The power source 150 can be incorporated into the NVDIMM package, or connected to the NVDIMM package (as illustrated). The power source 150 can provide power to enable the controller 125 to move data from the volatile portion 130 to the non-volatile portion 145 in case of host power failure.

The controller 125 described above, along with the host signaling and transfer of the firmware image 140 via the first interface 115 addresses the availability concerns raised by firmware updates in storage backed memory packages. By using the memory interface, performing a save, and then using the saved firmware image from the non-volatile portion 145, the NVDIMM 110 can effectuate firmware updates at many times the speed of traditional storage backed memory device. This can lead to more frequent updates by system users—examples of which are described below with respect to FIG. 2), and thus reduce performance problems due to firmware errors, or increase security due to vulnerabilities in firmware.

Figure 2:
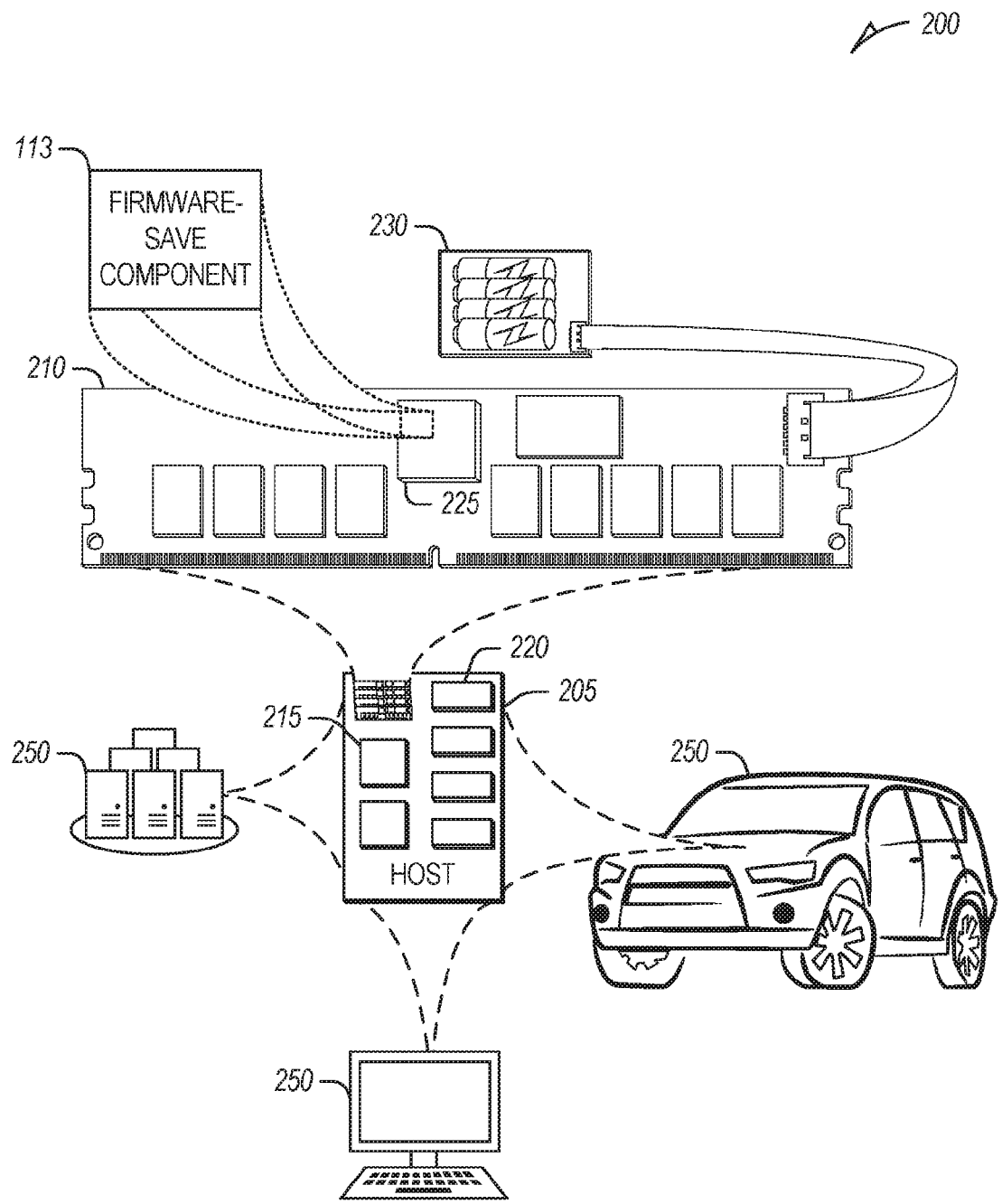
FIG. 2 illustrates an example of an environment including a system for firmware update in a storage backed memory package, in accordance with some implementations of the present disclosure.

FIG. 2 illustrates an example of an environment 200 including a system for firmware update in a storage backed memory package 210, in accordance with some implementations of the present disclosure. The environment 200 includes a host device 205 and the storage backed memory package 210. The host device 205 or the storage backed memory package 210 can be included in a variety of products 250, such as data center servers, personal computers, or Internet of Things (IoT) devices (e.g., a refrigerator or other appliance, sensor, motor or actuator, mobile communication device, automobile, drone, etc.) to support processing, communications, or control of the product 250. The system can be the storage backed memory package 210, or a component of the storage backed memory package 210 such as the on-package controller 225. The system can also include a memory controller 220 or a processor 215 of the host device 205.

One or more communication interfaces can be used to transfer data between the storage backed memory package 210 and one or more other components of the host device 205, such as the processor 215. In an example, DDR4 is an implemented communication interface. In an example, I2C is an implemented communication interface. The host device 205 can include a host system, an electronic device, a memory card reader, or one or more other electronic devices external to the storage backed memory package 210. In some examples, the host 205 can be a machine having some portion, or all, of the components discussed in reference to the machine 500 of FIG. 5.

The processor 215 (which can be referred to as the host) generally directs or coordinates the activities of the host device 205 and the included components. The memory controller 220 supports memory activities, including use of the storage hacked memory package 210, by components of the host device 205. The memory controller 220 can provide data addressing, and command coordination to the storage backed memory package 210. These activities can include data transfers to (e.g., write or erase) or from (e.g., read) one or more of the chips, ranks, or banks of the volatile portions of the storage backed memory package 210. The memory controller 215 can include, among other things, circuitry or firmware, including one or more components or integrated circuits. For example, the memory controller 215 can include one or more memory control units, circuits, or components configured to control access across the storage backed memory package 210 and to provide a translation layer between the host 205 and the storage backed memory package 210. The memory controller 215 can include one or more input/output (110) circuits, lines, or interfaces to transfer data to or from the storage backed memory package 210.

The memory controller 215 can include, among other things, circuitry or firmware, such as a number of components or integrated circuits associated with various memory management functions, such as de-fragmentation, or firmware-save techniques described herein (e.g., firmware-save component 113). The memory controller 215 can parse or format host commands (e.g., commands received from a host) into device commands (e.g., commands associated with operation of a memory array, etc.), or generate device commands (e.g., to accomplish various memory management functions) for the storage backed memory package 210 or one or more other components of the storage backed memory package 210.

The memory controller 215 can include, among other things, circuitry or components configured to control memory operations associated with writing data to, reading data from, or erasing one or more memory cells of the storage hacked memory package 210. The memory operations can be based on, for example, host commands received from the host 205, or internally generated by the memory controller 215 (e.g., in association with defragmentation, error correction, refresh, etc.). The memory controller 215 can include code or logic to communicate using a standardized protocol (or features from a standardized protocol such as GDDR6.

The storage hacked memory package 210 can include the on-package controller 225 in addition to a volatile memory (e.g., DRAM or SRAM) and a non-volatile portion (e.g., flash). The storage backed memory package 210 can also include an on-hoard power source, or external power source 230, such as an electric double-layer capacitor (e.g., ELDC, supercapacitor, supercap, ultracapacitor, ultracap, etc.), battery, etc. The power source 230 can he independent of other host power sources and enable the on-package controller 225 to transfer data from volatile portions of the storage backed memory package 210 to non-volatile portions of the storage backed memory package 210 when host power fails. The on-package controller 225 can also move data from the non-volatile portions to the volatile portions (e.g., upon host power recovery) or provide access to the non-volatile portions directly. This last ability can enable greater error analysis during a host crash, for example, than is possible with standard system memory devices.

Figure 3:
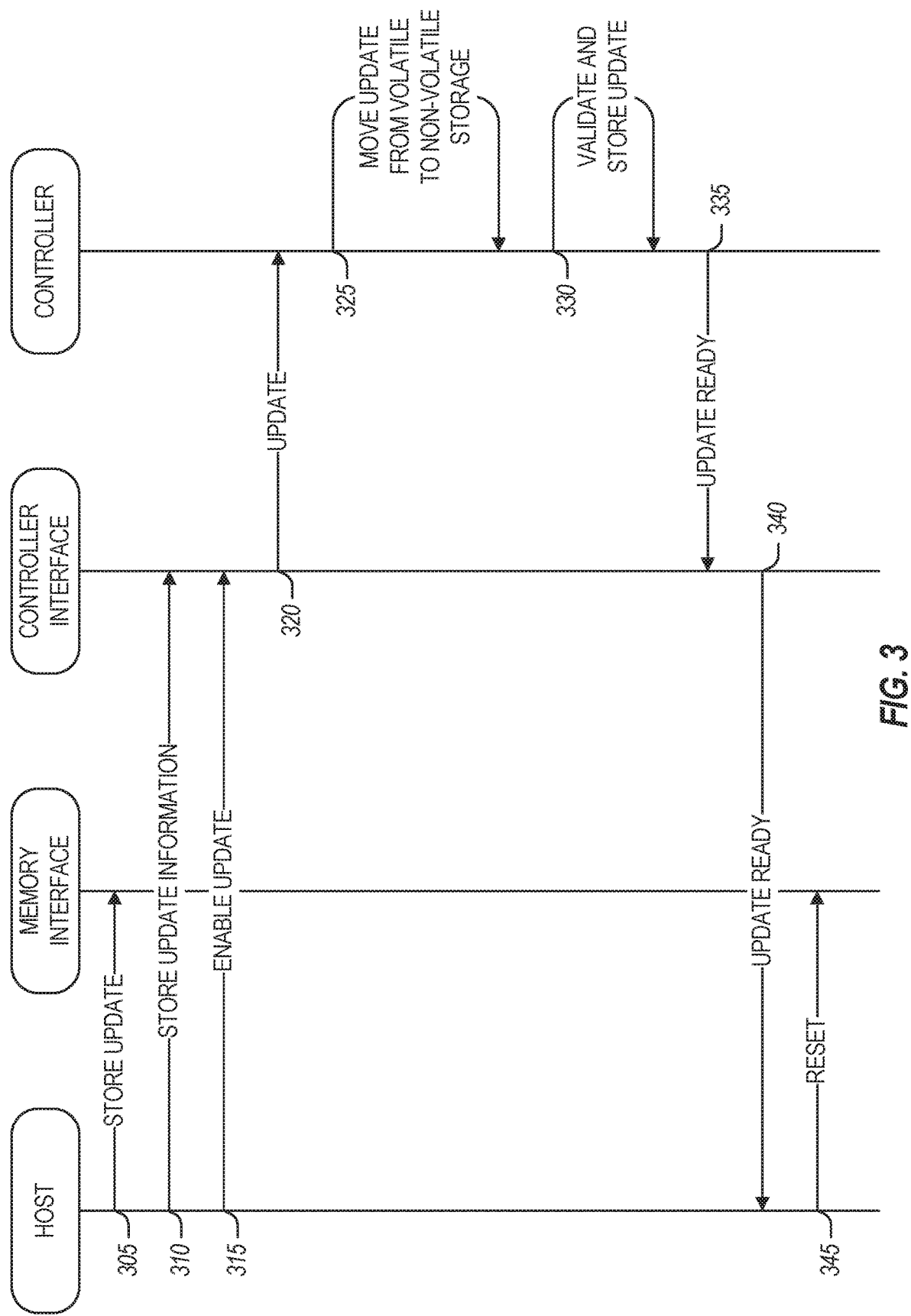
FIG. 3 illustrates an example component messaging to implement a firmware update in a storage backed memory package, in accordance with some implementations of the present disclosure.

FIG. 3 illustrates an example component messaging to implement a firmware update in a storage backed memory package, in accordance with some implementations of the present disclosure. The illustrated HOST, MEMORY INTERFACE (e.g., DDR), CONTROLLER INTERFACE (e.g., I2C), and CONTROLLER components are similar to those described above. In an example, the MEMORY INTERFACE and the CONTROLLER INTERFACE are interfaces of the CONTROLLER. In this example, the illustrated message flows distinguish between the MEMORY INTERFACE and CONTROLLER INTERFACE portions of the CONTROLLER and other portions of the CONTROLLER, such as those executing firmware to perform other actions.

The HOST writes a firmware update image into a specific address of memory DRAM via the MEMORY INTERFACE (message 305). In an example, this address of DRAM can be allocated as NV-DRAM per an attribute in a HOST memory map as provided, for example, by a boot subsystem (e.g., Basic Input-Output System (BIOS), or Unified Extensible Firmware Interface (UEFI)) of the HOST. For a use case, let the firmware image address in DRAM be zero relative to the start of the non-volatile storage.

The HOST then updates the partial save registers of the CONTROLLER—which instruct the CONTROLLER to transfer a portion of DRAM (the portion specified by a starting address or offset and length) contents to NAND. In the use case mentioned above, let the HOST specify ten megabits starting at offset zero.

The HOST the CONTROLLER, for example via a vendor specific register, that a firmware image update via NAND is about to be requested (message 310). The HOST then enables a firmware update mode (e.g., via a register specified in the JEDEC BAEBI family of standards) (message 315). The register settings are communicated to the CONTROLLER via the CONTROLLER interface (message 320).

When the CONTROLLER observes that messages 310 and 315 are completed, the CONTROLLER sets an "operation in progress" bit for the firmware update, performs the partial save (operation 325), keeping track of which non-volatile storage blocks have been used to store the DRAM contents holding the firmware image.

The controller then validates and stores the firmware image (operation 330). This can include reading the first page of NAND used in the save operation into CONTROLLER state memory (e.g., RAM used by the CONTROLLER to hold state data) and searching for the firmware image header in that data. The firmware image header has enough unique data stored in it, such as vendor or product identifier, to distinguish it from other data. The CONTROLLER can also move the payload data (e.g., data from the firmware image exclusive of headers or ECC data), from the CONTROLLER memory into serial NOR.

Once the entire firmware image is transferred to NOR, the CONTROLLER can checksum and validate a signature of the firmware image to ensure it was received properly and the image is valid. After firmware image is validated (message 335), a warm boot vector can be updated and the HOST is signaled (message 340) that a valid firmware image has been received.

The HOST then issues a reset (message 345) to the NVDIMM to start the new firmware image on the CONTROLLER. In an example, the HOST re-trains the raw address to column address delay (RCD) following the restart. In an example, the HOST ensures that DRAM scrambling is not enabled.

Figure 4:
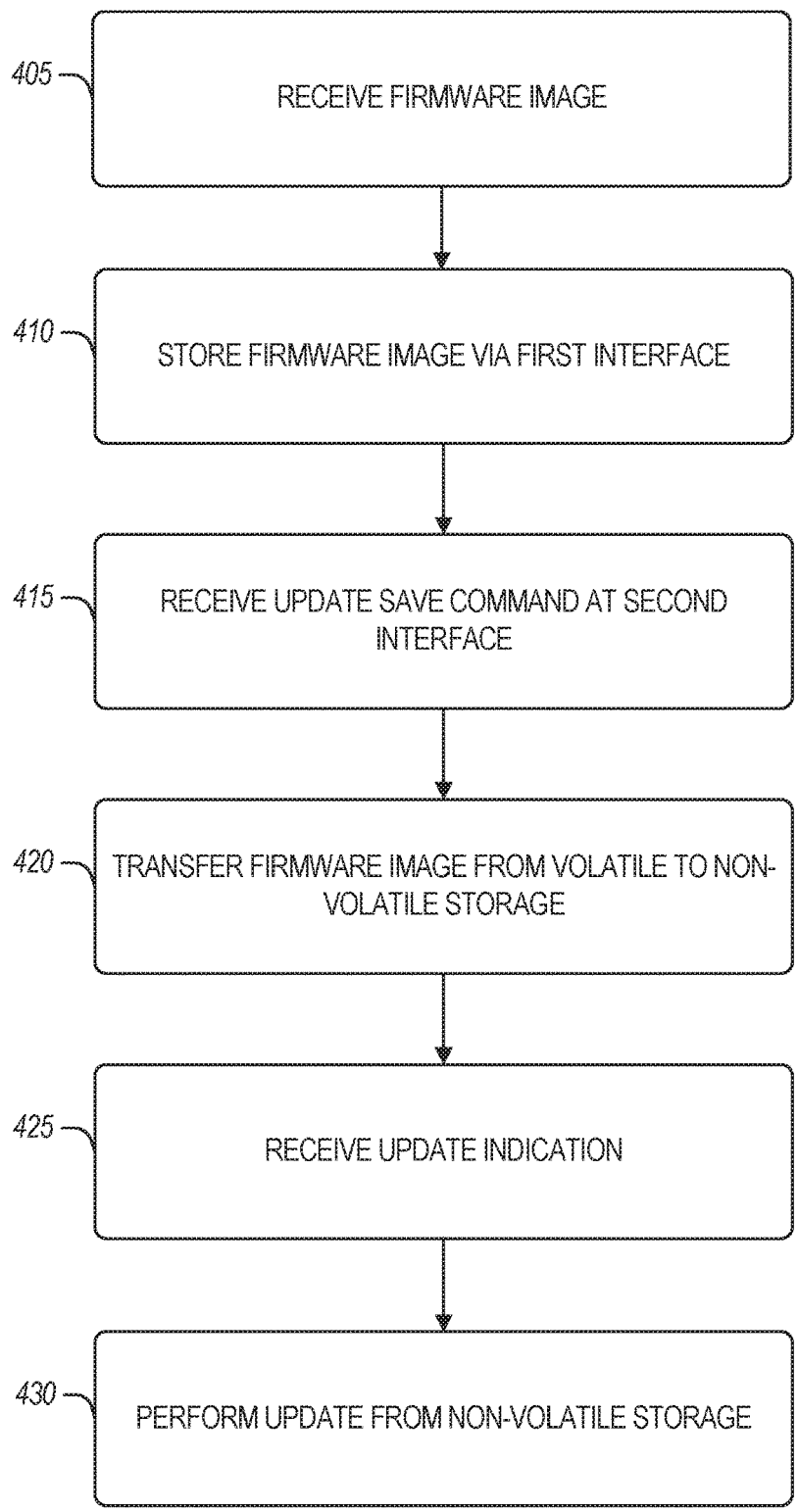
FIG. 4 illustrates an example flowchart of a method for firmware update in a storage backed memory package, in accordance with some implementations of the present disclosure.

FIG. 4 illustrates an example flowchart of a method 400 for firmware update in a storage hacked memory package, in accordance with some implementations of the present disclosure. The operations of the method 400 are implemented in electronic hardware, such as that described above with respect to FIGS. 1-2 and below with respect to FIG. 5 (e.g., in circuitry).

At operation 405, a firmware image is received (e.g., at a first interface of the memory package). In an example, the first interface is a double data rate (DDR) random-access memory (RAM) interface. In an example, the memory package conforms to a NVDIMM. In an example, the NVDIMM is a NVDIMM-N type in accordance with a JEDEC family of standards.

At operation 410, the firmware image is stored to a volatile portion of the memory package. In an example, the storing is performed in response to receipt of the firmware image via the first interface.

At operation 415, a save indication is received at a second interface of the memory package. In an example, the second interface is a bus that operates in accordance with an I2C family of standards. In an example, the save indication is a register setting of the memory package. In an example, the register setting includes a first register that includes a starting offset within the volatile portion of the memory package, and a second register that includes a length. Here, the starting offset and the length corresponding to the firmware image.

At operation 420, the firmware image is transferred from the volatile portion of the memory package to the non-volatile portion of the memory package based on the save indication. In an example, transferring the firmware image from the volatile portion of the memory package to the non-volatile portion of the memory package is also based on a firmware update indication (e.g., operation 425 below).

In an example, transferring the firmware image from the volatile portion of the memory package to the non-volatile portion of the memory package includes transferring the firmware image to a NAND flash segment of the non-volatile portion of the memory package. In an example, transferring the firmware image from the volatile portion of the memory package to the non-volatile portion of the memory package includes verifying the firmware image by a controller of the memory package. In an example, verifying the firmware image includes inspecting a first page of the NAND flash segment to identify a firmware image header based on data unique to an update header.

In an example, transferring the firmware image from the volatile portion of the memory package to the non-volatile portion of the memory package includes transferring the firmware image from the NAND flash segment to a serial NOR flash segment of the non-volatile portion of the memory package. In an example, transferring the firmware image from the NAND flash segment to the serial NOR flash segment includes removing at least one of headers or error correction code (ECC) data from the firmware image.

At operation 425 a firmware update indication is received at the second interface. In an example, the firmware update indication is a register setting of the memory package. In an example, the register setting includes a register setting that a firmware download via a segment of the non-volatile portion of the memory package is forthcoming. In an example, the register setting includes a register setting for firmware update mode in accordance with a JEDEC BAEBI family of standards. In an example, the JEDEC BAEBI family of standards include a JESD245B.01 standard.

At operation 430, a firmware update of the memory package is performed based on the firmware update indication. In an example, performing the firmware update includes validating at least one of a checksum or a signature of the firmware image. In an example, performing the firmware update includes updating a boot vector to point to the firmware image. In an example, performing the firmware update includes communicating to a host that the firmware image is valid and has been received. In an example, performing the firmware update includes restarting the memory package in response to receipt of a reset command that was transmitted in response to the communication to the host that firmware image is valid and has been received. Here, the memory package uses the firmware image following the restart.

Figure 5:
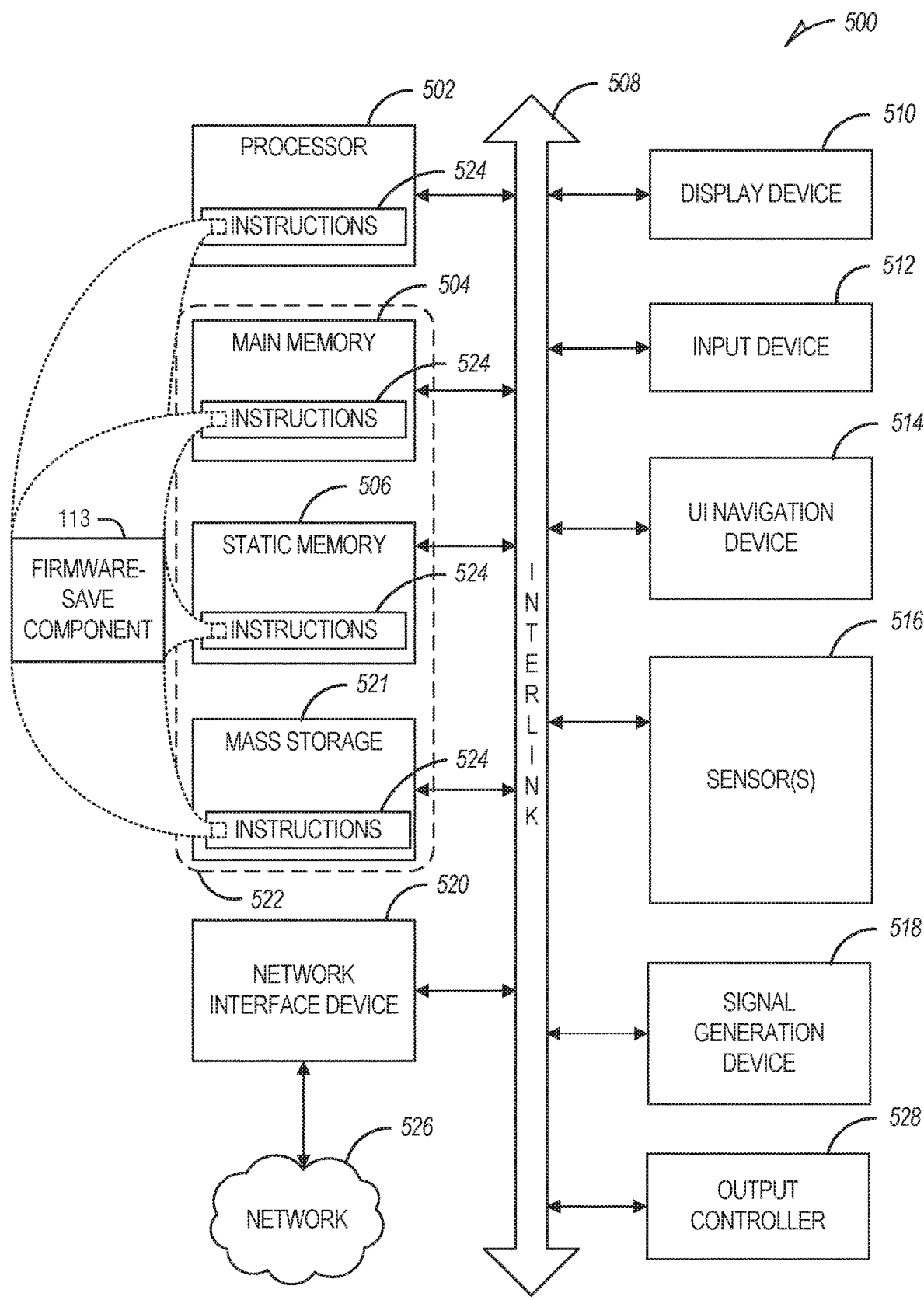
FIG. 5 is a block diagram illustrates an example computer system within which a set of instructions may be executed for causing the machine to perform any one or more of the methodologies discussed herein, according to implementations of the present disclosure.

FIG. 5 illustrates a block diagram illustrates an example computer system (e.g., machine 500) within which a set of instructions may be executed for causing the machine 500 to perform any one or more of the methodologies discussed herein, according to implementations of the present. In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can he a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry (e.g., a circuit set, processing circuitry, etc.) is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 500 can include a hardware processor 502 (e.g., a CPU, a GPU, a hardware processor core, or any combination thereof), a main memory 504 and a static memory 506, some or all of which can communicate with each other via an interlink (e.g., bus) 508. The machine 500 can further include a display unit 510, an alphanumeric input device 512 (e.g., a keyboard), and a user interface (UI) navigation device 514 (e.g., a mouse). In an example, the display unit 510, input device 512, and UI navigation device 514 can be a touch screen display. The machine 500 can additionally include a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine 500 can include one or more machine readable medium 522 on which is stored one or more sets of data structures or instructions 524 (e.g., software) embodying or utilized by any one or more of the techniques or functions described herein, such as the firmware-save component 113. The machine readable medium 522 can include one or more of: main memory 524, static memory 506, and mass storage 521. The instructions 524 can reside, completely or at least partially, within the main memory 504, within static memory 506, mass storage 521 or within the hardware processor 502 during execution thereof by the machine 500. In an example, one or any combination of the hardware processor 502, the main memory 504, the static memory 506, or the mass storage 521 can constitute the machine readable medium 522.

While the machine readable medium 522 is illustrated as a single medium, the term "machine readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples can include solid-state memories, optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., EPROM, EEPROM) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the mass storage 521, can be accessed by the memory 504 for use by the processor 502. The memory 504 (e.g., DRAM) is typically fast, but volatile, and thus a different type of storage than the mass storage 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the mass storage 521 can be allocated to supplement the memory 504; however, because the mass storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the mass storage 521 for virtual memory can greatly reduce the usable lifespan of the mass storage 521.

In contrast to virtual memory, virtual memory compression (e.g., the Linux® kernel feature "ZRAM") uses part of the memory as compressed block storage to avoid paging to the mass storage 521. Paging takes place in the compressed block until it is necessary to write such data to the mass storage 521. Virtual memory compression increases the usable size of memory 504, while reducing wear on the mass storage 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, and the like. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 can further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL EXAMPLES

Example 1 is a memory package for firmware update in a storage backed memory package, the memory package comprising: a volatile portion; a non-volatile portion; a first interface to receive a firmware image; a second interface to: receive a save indication; and receive a firmware update indication; and a processing device to: store a firmware image to the volatile portion in response to receipt of the firmware image; transfer the firmware image from the volatile portion to the non-volatile portion based on the save indication; and perform a firmware update of the memory package based on the firmware update indication.

In Example 2, the subject matter of Example 1 includes, wherein the second interface is a bus that operates in accordance with an I2C family of standards.

In Example 3, the subject matter of Examples 1-2 includes, wherein the first interface is a double data rate (DDR) random-access memory (RAM) interface.

In Example 4, the subject matter of Example 3 includes, wherein the memory package conforms to a non-volatile dual in-line memory module (NVDIMM).

In Example 5, the subject matter of Example 4 includes, wherein the NVDIMM is a NVDIMM-N type in accordance with a Joint Electron Device Engineering Council (JEDEC) family of standards.

In Example 6, the subject matter of Examples 1-5 includes, wherein the save indication is a register setting of the memory package.

In Example 7, the subject matter of Example 6 includes, wherein the register setting includes a first register that includes a starting offset within the volatile portion, and a second register that includes a length, the starting offset and the length corresponding to the firmware image.

In Example 8, the subject matter of Examples 1-7 includes, wherein the firmware update indication is a register setting of the memory package.

In Example 9, the subject matter of Example 8 includes, wherein the register setting includes a register setting that a firmware download via a segment of the non-volatile portion is forthcoming.

In Example 10, the subject matter of Examples 8-9 includes, wherein the register setting includes a register setting for firmware update mode in accordance with a Joint Electron Device Engineering Council (JEDEC) Byte Addressable Energy Backed Interface (BAEBI) family of standards.

In Example 11, the subject matter of Example 10 includes, wherein the JEDEC BAEBI family of standards include a JESD245B.01 standard.

In Example 12, the subject matter of Examples 1-11 includes, wherein the transfer of the firmware image from the volatile portion to the non-volatile portion is also based on the firmware update indication.

In Example 13, the subject matter of Examples 1-12 includes, wherein, to transfer the firmware image from the volatile portion to the non-volatile portion, the processing device transfers the firmware image to a NAND flash segment of the non-volatile portion.

In Example 14, the subject matter of Example 13 includes, wherein, to transfer the firmware image from the volatile portion to the non-volatile portion, the processing device verifies the firmware image.

In Example 15, the subject matter of Example 14 includes, wherein, to verify the firmware image, the processing device inspects a first page of the NAND flash segment to identify a firmware image header based on data unique to an update header.

In Example 16, the subject matter of Examples 13-15 includes, wherein, to transfer the firmware image from the volatile portion to the non-volatile portion, the processing device transfers the firmware image from the NAND flash segment to a serial NOR flash segment of the non-volatile portion.

In Example 17, the subject matter of Example 16 includes, wherein, to transfer the firmware image from the NAND flash segment to the serial NOR flash segment, the processing device removes at least one of headers or error correction code (ECC) data from the firmware image.

In Example 18, the subject matter of Examples 16-17 includes, wherein, to perform the firmware update, the processing device validates at least one of a checksum or signature of the firmware image.

In Example 19, the subject matter of Examples 16-18 includes, wherein, to perform the firmware update, the processing device: updates a boot vector to point to the firmware image; and communicates to a host that the firmware image is valid and has been received.

In Example 20, the subject matter of Example 19 includes, wherein, to perform the firmware update, the processing device restarts the memory package in response to receipt of a reset command that was transmitted in response to the communication to the host that firmware image is valid and has been received, wherein the memory package uses the firmware image following the restart.

Example 21 is a method for firmware update in a storage backed memory package, the method comprising: storing a firmware image to a volatile portion of the memory package in response to receiving the firmware image via a first interface of the memory package; receiving, at a second interface of the memory package, a save indication; transferring the firmware image from the volatile portion of the memory package to a non-volatile portion of the memory package based on the save indication; receiving, at the second interface, a firmware update indication; and performing a firmware update of the memory package based on the firmware update indication.

In Example 22, the subject matter of Example 21 includes, wherein the second interface is a bus that operates in accordance with an I2C family of standards.

In Example 23, the subject matter of Examples 21-22 includes, wherein the first interface is a double data rate (DDR) random-access memory (RAM) interface.

In Example 24, the subject matter of Example 23 includes, wherein the memory package conforms to a non-volatile dual in-line memory module (NVDIMM).

In Example 25, the subject matter of Example 24 includes, wherein the NVDIMM is a NVDIMM-N type in accordance with a Joint Electron Device Engineering Council (JEDEC) family of standards.

In Example 26, the subject matter of Examples 21-25 includes, wherein the save indication is a register setting of the memory package.

In Example 27, the subject matter of Example 26 includes, wherein the register setting includes a first register that includes a starting offset within the volatile portion of the memory package, and a second register that includes a length, the starting offset and the length corresponding to the firmware image.

In Example 28, the subject matter of Examples 21-27 includes, wherein the firmware update indication is a register setting of the memory package.

In Example 29, the subject matter of Example 28 includes, wherein the register setting includes a register setting that a firmware download via a segment of the non-volatile portion of the memory package is forthcoming.

In Example 30, the subject matter of Examples 28-29 includes, wherein the register setting includes a register setting for firmware update mode in accordance with a Joint Electron Device Engineering Council (JEDEC) Byte Addressable Energy Backed Interface (BAEBI) family of standards.

In Example 31, the subject matter of Example 30 includes, wherein the JEDEC BAEBI family of standards include a JESD245B.01 standard.

In Example 32, the subject matter of Examples 21-31 includes, wherein transferring the firmware image from the volatile portion of the memory package to the non-volatile portion of the memory package is also based on the firmware update indication.

In Example 33, the subject matter of Examples 21-32 includes, wherein transferring the firmware image from the volatile portion of the memory package to the non-volatile portion of the memory package includes transferring the firmware image to a NAND flash segment of the non-volatile portion of the memory package.

In Example 34, the subject matter of Example 33 includes, wherein transferring the firmware image from the volatile portion of the memory package to the non-volatile portion of the memory package includes verifying the firmware image by a processing device of the memory package.

In Example 35, the subject matter of Example 34 includes, wherein verifying the firmware image includes inspecting a first page of the NAND flash segment to identify a firmware image header based on data unique to an update header.

In Example 36, the subject matter of Examples 33-35 includes, wherein transferring the firmware image from the volatile portion of the memory package to the non-volatile portion of the memory package includes transferring the firmware image from the NAND flash segment to a serial NOR flash segment of the non-volatile portion of the memory package.

In Example 37, the subject matter of Example 36 includes, wherein transferring the firmware image from the NAND flash segment to the serial NOR flash segment includes removing at least one of headers or error correction code (ECC) data from the firmware image.

In Example 38, the subject matter of Examples 36-37 includes, wherein performing the firmware update includes validating at least one of a checksum or signature of the firmware image.

In Example 39, the subject matter of Examples 36-38 includes, wherein performing the firmware update includes: updating a boot vector to point to the firmware image; and communicating to a host that the firmware image is valid and has been received.

In Example 40, the subject matter of Example 39 includes, wherein performing the firmware update includes restarting the memory package in response to receipt of a reset command that was transmitted in response to the communication to the host that firmware image is valid and has been received, wherein the memory package uses the firmware image following the restart.

Example 41 is at least machine readable medium including instructions for firmware update in a storage backed memory package, the instructions, when executed by processing circuitry of the memory package, cause the memory package to perform operations comprising: storing a firmware image to a volatile portion of the memory package in response to receiving the firmware image via a first interface of the memory package; receiving, at a second interface of the memory package, a save indication; transferring the firmware image from the volatile portion of the memory package to a non-volatile portion of the memory package based on the save indication; receiving, at the second interface, a firmware update indication; and performing a firmware update of the memory package based on the firmware update indication.

In Example 42, the subject matter of Example 41 includes, wherein the second interface is a bus that operates in accordance with an I2C family of standards.

In Example 43, the subject matter of Examples 41-42 includes, wherein the first interface is a double data rate (DDR) random-access memory (RAM) interface.

In Example 44, the subject matter of Example 43 includes, wherein the memory package conforms to a non-volatile dual in-line memory module (NVDIMM).

In Example 45, the subject matter of Example 44 includes, wherein the NVDIMM is a NVDIMM-N type in accordance with a Joint Electron Device Engineering Council (JEDEC) family of standards.

In Example 46, the subject matter of Examples 41-45 includes, wherein the save indication is a register setting of the memory package.

In Example 47, the subject matter of Example 46 includes, wherein the register setting includes a first register that includes a starting offset within the volatile portion of the memory package, and a second register that includes a length, the starting offset and the length corresponding to the firmware image.

In Example 48, the subject matter of Examples 41-47 includes, wherein the firmware update indication is a register setting of the memory package.

In Example 49, the subject matter of Example 48 includes, wherein the register setting includes a register setting that a firmware download via a segment of the non-volatile portion of the memory package is forthcoming.

In Example 50, the subject matter of Examples 48-49 includes, wherein the register setting includes a register setting for firmware update mode in accordance with a Joint Electron Device Engineering Council (JEDEC) Byte Addressable Energy Backed Interface (BAEBI) family of standards.

In Example 51, the subject matter of Example 50 includes, wherein the JEDEC BAEBI family of standards include a JESD245B.01 standard.

In Example 52, the subject matter of Examples 41-51 includes, wherein transferring the firmware image from the volatile portion of the memory package to the non-volatile portion of the memory package is also based on the firmware update indication.

In Example 53, the subject matter of Examples 41-52 includes, wherein transferring the firmware image from the volatile portion of the memory package to the non-volatile portion of the memory package includes transferring the firmware image to a NAND flash segment of the non-volatile portion of the memory package.

In Example 54, the subject matter of Example 53 includes, wherein transferring the firmware image from the volatile portion of the memory package to the non-volatile portion of the memory package includes verifying the firmware image by a processing device of the memory package.

In Example 55, the subject matter of Example 54 includes, wherein verifying the firmware image includes inspecting a first page of the NAND flash segment to identify a firmware image header based on data unique to an update header.

In Example 56, the subject matter of Examples 53-55 includes, wherein transferring the firmware image from the volatile portion of the memory package to the non-volatile portion of the memory package includes transferring the firmware image from the NAND flash segment to a serial NOR flash segment of the non-volatile portion of the memory package.

In Example 57, the subject matter of Example 56 includes, wherein transferring the firmware image from the NAND flash segment to the serial NOR flash segment includes removing at least one of headers or error correction code (ECC) data from the firmware image.

In Example 58, the subject matter of Examples 56-57 includes, wherein performing the firmware update includes validating at least one of a checksum or signature of the firmware image.

In Example 59, the subject matter of Examples 56-58 includes, wherein performing the firmware update includes: updating a boot vector to point to the firmware image; and communicating to a host that the firmware image is valid and has been received.

In Example 60, the subject matter of Example 59 includes, wherein performing the firmware update includes restarting the memory package in response to receipt of a reset command that was transmitted in response to the communication to the host that firmware image is valid and has been received, wherein the memory package uses the firmware image following the restart.

Example 61 is a system for firmware update in a storage backed memory package, the system comprising: means for storing a firmware image to a volatile portion of the memory package in response to receiving the firmware image via a first interface of the memory package; means for receiving, at a second interface of the memory package, a save indication; means for transferring the firmware image from the volatile portion of the memory package to a non-volatile portion of the memory package based on the save indication; means for receiving, at the second interface, a firmware update indication; and means for performing a firmware update of the memory package based on the firmware update indication.

In Example 62, the subject matter of Example 61 includes, wherein the second interface is a bus that operates in accordance with an I2C family of standards.

In Example 63, the subject matter of Examples 61-62 includes, wherein the first interface is a double data rate (DDR) random-access memory (RAM) interface.

In Example 64, the subject matter of Example 63 includes, wherein the memory package conforms to a non-volatile dual in-line memory module (NVDIMM).

In Example 65, the subject matter of Example 64 includes, wherein the NVDIMM is a NVDIMM-N type in accordance with a Joint Electron Device Engineering Council (JEDEC) family of standards.

In Example 66, the subject matter of Examples 61-65 includes, wherein the save indication is a register setting of the memory package.

In Example 67, the subject matter of Example 66 includes, wherein the register setting includes a first register that includes a starting offset within the volatile portion of the memory package, and a second register that includes a length, the starting offset and the length corresponding to the firmware image.

In Example 68, the subject matter of Examples 61-67 includes, wherein the firmware update indication is a register setting of the memory package.

In Example 69, the subject matter of Example 68 includes, wherein the register setting includes a register setting that a firmware download via a segment of the non-volatile portion of the memory package is forthcoming.

In Example 70, the subject matter of Examples 68-69 includes, wherein the register setting includes a register setting for firmware update mode in accordance with a Joint Electron Device Engineering Council (JEDEC) Byte Addressable Energy Backed Interface (BAEBI) family of standards.

In Example 71, the subject matter of Example 70 includes, wherein the JEDEC BAEBI family of standards include a JESD245B.01 standard.

In Example 72, the subject matter of Examples 61-71 includes, wherein transferring the firmware image from the volatile portion of the memory package to the non-volatile portion of the memory package is also based on the firmware update indication.

In Example 73, the subject matter of Examples 61-72 includes, wherein the means for transferring the firmware image from the volatile portion of the memory package to the non-volatile portion of the memory package include means for transferring the firmware image to a NAND flash segment of the non-volatile portion of the memory package.

In Example 74, the subject matter of Example 73 includes, wherein the means for transferring the firmware image from the volatile portion of the memory package to the non-volatile portion of the memory package include means for verifying the firmware image by a processing device of the memory package.

In Example 75, the subject matter of Example 74 includes, wherein the means for verifying the firmware image include means for inspecting a first page of the NAND flash segment to identify a firmware image header based on data unique to an update header.

In Example 76, the subject matter of Examples 73-75 includes, wherein the means for transferring the firmware image from the volatile portion of the memory package to the non-volatile portion of the memory package include means for transferring the firmware image from the NAND flash segment to a serial NOR flash segment of the non-volatile portion of the memory package.

In Example 77, the subject matter of Example 76 includes, wherein the means for transferring the firmware image from the NAND flash segment to the serial NOR flash segment include means for removing at least one of headers or error correction code (ECC) data from the firmware image.

In Example 78, the subject matter of Examples 76-77 includes, wherein the means for performing the firmware update include means for validating at least one of a checksum or signature of the firmware image.

In Example 79, the subject matter of Examples 76-78 includes, wherein the means for performing the firmware update include: means for updating a boot vector to point to the firmware image; and means for communicating to a host that the firmware image is valid and has been received.

In Example 80, the subject matter of Example 79 includes, wherein the means for performing the firmware update include means for restarting the memory package in response to receipt of a reset command that was transmitted in response to the communication to the host that firmware image is valid and has been received, wherein the memory package uses the firmware image following the restart.

Example 81 is at least one machine-readable medium including instructions that, when executed by processing circuitry, cause the processing circuitry to perform operations to implement of any of Examples 1-80, Example 82 is an apparatus comprising means to implement of any of Examples 1-80.

Example 83 is a system to implement of any of Examples 1-80.

Example 84 is a method to implement of any of Examples 1-80.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

It will be understood that when an element is referred to as being "on," "connected to," or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

The above description is intended to be illustrative, and not restrictive. For example, the above-described examples or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should he determined with reference to the appended claims, along with the full scope of equivalents to which such claims are entitled.

What is claimed is:

1. A memory system package comprising:
a volatile memory portion;
a first non-volatile memory portion;
a memory controller that comprises a second non-volatile memory portion and a processing device;
a first hardware interface to communicate data between a host system and the volatile memory portion, and to receive a firmware image; and
a second hardware interface to communicate register data between the host system and the memory controller, to receive a save indication from the host system, and to receive a firmware update indication from the host system, the save indication comprising a register setting that sets a first register with a starting offset and that sets a second register with a length, and the starting offset and the length corresponding to storage of the firmware image on the volatile memory portion, and the starting offset comprising a memory address of the volatile memory portion, the processing device being configured to perform operations comprising:
in response to receiving the firmware image from the host system via the first hardware interface, causing the firmware image to be stored on the volatile memory portion;
in response to receiving the save indication from the host system via the second hardware interface:
transferring the firmware image from the volatile memory portion to the first non-volatile memory portion based on the starting offset specified by the first register and the length specified by the second register;
verifying the firmware image by inspecting a page of the first non-volatile memory portion to identify a firmware update header; and
transferring the firmware image from the first non-volatile memory portion to the second non-volatile memory portion of the memory controller; and
in response to receiving the firmware update indication from the host system via the second hardware interface, performing a firmware update of the memory system based on the firmware image stored on the second non-volatile memory portion, the performing the firmware update comprising updating a boot vector of the memory system to point to where the firmware image is stored on the second non-volatile memory portion of the memory controller.

2. The memory system of claim 1, wherein the second hardware interface is a bus that operates in accordance with an Inter-Integrated Circuit (I2C) family of standards.

3. The memory system of claim 1, wherein the first hardware interface is a double data rate (DDR) random-access memory (RAM) interface.

4. The memory system of claim 1, wherein the first non-volatile memory portion comprises a NAND flash segment.

5. The memory system of claim 1, wherein the second non-volatile memory portion of the memory controller comprises a serial NOR flash segment.

6. The memory system of claim 1, wherein the performing the firmware update comprises:
communicating to the host system that the firmware image is valid and has been received.

7. The memory system of claim 6, wherein the performing the firmware update further comprises restarting the memory system in response to receipt of a reset command from the host system, the reset command being transmitted by the host system in response to the communicating to the host system that the firmware image has been received and is valid, wherein the memory system uses the firmware image following the restart.

8. A method for a firmware update in a memory system, the method comprising:
   receiving, at a first hardware interface of the memory system, a firmware image, the first hardware interface being configured to communicate data between a host system and a volatile memory portion of the memory system;
   in response to receiving the firmware image from the host system via the first hardware interface, causing the firmware image to be stored on the volatile memory portion of the memory system package;
   receiving, at a second hardware interface of the memory system, a save indication from the host system, the second hardware interface being configured to communicate register data between the host system and a memory controller of the memory system, the save indication comprising a register setting that sets a first register with a starting offset and that sets a second register with a length, and the starting offset and the length corresponding to storage of the firmware image on the volatile memory portion, and the starting offset comprising a memory address of the volatile memory portion;
   in response to receiving the save indication from the host system via the second hardware interface:
      transferring the firmware image from the volatile memory portion of the memory system to a first non-volatile memory portion of the memory system based on the starting offset specified by the first register and the length specified by the second register;
      verifying the firmware image by inspecting a page of the first non-volatile memory portion to identify a firmware update header; and
      transferring the firmware image from the first non-volatile memory portion to a second non-volatile memory portion of the memory controller;
   receiving, at the second hardware interface, a firmware update indication from the host system; and
   in response to receiving the firmware update indication from the host system via the second hardware interface, performing a firmware update of the memory system based on the firmware image stored on the second non-volatile memory portion, the performing the firmware update comprising updating a boot vector of the memory system to point to where the firmware image is stored on the second non-volatile memory portion of the memory controller.

9. The method of claim 8, wherein the second hardware interface is a bus that operates in accordance with an Inter-Integrated Circuit (I2C) family of standards.

10. The method of claim 8, wherein the first hardware interface is a double data rate (DDR) random-access memory (RAM) interface.

11. The method of claim 8, wherein the first non-volatile memory portion comprises a NAND flash segment.

12. The method of claim 11, wherein the second non-volatile memory portion of the memory controller comprises a serial NOR flash segment.

13. The method of claim 12, wherein the performing the firmware update comprises:
   communicating to the host system that the firmware image is valid and has been received.

14. The method of claim 13, wherein the performing the firmware update further comprises restarting the memory system in response to receipt of a reset command from the host system, the reset command being transmitted by the host system in response to the communicating to the host system that firmware image is valid and has been received, wherein the memory system uses the firmware image following the restart.

15. At least one non-transitory machine readable medium including instructions for a firmware update in a memory system, the instructions, when executed by processing circuitry of the memory system, cause the memory system to perform operations comprising:
   receiving, at a first hardware interface of the memory system, a firmware image from a host system, the first hardware interface being configured to communicate data between the host system and a volatile memory portion of the memory system;
   in response to receiving the firmware image from the host system via the first hardware interface, causing the firmware image to be stored on the volatile memory portion of the memory system;
   receiving, at a second hardware interface of the memory system, a save indication from the host system, the second hardware interface being configured to communicate register data between the host system and a memory controller of the memory system, the save indication comprising a register setting that sets a first register with a starting offset and that sets a second register with a length, and the starting offset and the length corresponding to storage of the firmware image on the volatile memory portion, and the starting offset comprising a memory address of the volatile memory portion;
   in response to receiving the save indication from the host system via the second hardware interface:
      transferring the firmware image from the volatile memory portion of the memory system to a first non-volatile memory portion of the memory system based on the starting offset specified by the first register and the length specified by the second register;
      verifying the firmware image by inspecting a page of the first non-volatile memory portion to identify a firmware update header; and
      transferring the firmware image from the first non-volatile memory portion to a second non-volatile memory portion of the memory controller;
   receiving, at the second hardware interface, a firmware update indication; and
   in response to receiving the firmware update indication from the host system via the second hardware interface, performing the firmware update of the memory system package based on the firmware image stored on the second non-volatile memory portion, the performing the firmware update comprising updating a boot vector of the memory system package to point to where the firmware image is stored on the second non-volatile memory portion of the memory controller.

16. The at least one non-transitory machine readable medium of claim 15, wherein the second hardware interface is a bus that operates in accordance with an Inter-Integrated Circuit (I2C) family of standards.

17. The at least one non-transitory machine readable medium of claim 15, wherein the first hardware interface is a double data rate (DDR) random-access memory (RAM) interface.

18. The at least one non-transitory machine readable medium of claim 15, wherein the first non-volatile memory portion comprises a NAND flash segment.

19. The at least one non-transitory machine readable medium of claim 15, wherein the second non-volatile memory portion of the memory controller comprises a serial NOR flash segment.

20. The at least one non-transitory machine readable medium of claim 15, wherein the performing the firmware update comprises:

communicating to the host system that the firmware image is valid and has been received.

* * * * *